(12) United States Patent
Krivoy

(10) Patent No.: US 11,851,933 B2
(45) Date of Patent: Dec. 26, 2023

(54) ENCODER DRIVEN NON-HANDED ELECTRIC DOOR OPERATOR

(71) Applicant: Mary Alison Kirkland, Corpus Christi, TX (US)

(72) Inventor: Paul J. Krivoy, Corpus Christi, TX (US)

( * ) Notice: Subject to any disclaimer, the term of this patent is extended or adjusted under 35 U.S.C. 154(b) by 307 days.

(21) Appl. No.: 17/450,435

(22) Filed: Oct. 8, 2021

(65) Prior Publication Data

US 2022/0112758 A1 Apr. 14, 2022

Related U.S. Application Data

(63) Continuation of application No. 29/779,182, filed on Apr. 16, 2021, now Pat. No. Des. 989,139.

(60) Provisional application No. 63/089,274, filed on Oct. 8, 2020.

(51) Int. Cl.
*H03K 17/96* (2006.01)
*E05F 15/614* (2015.01)
*H02K 7/116* (2006.01)
*H02K 11/21* (2016.01)

(52) U.S. Cl.
CPC ............ *E05F 15/614* (2015.01); *H02K 7/116* (2013.01); *H02K 11/21* (2016.01); *E05Y 2201/434* (2013.01); *E05Y 2201/624* (2013.01); *E05Y 2201/716* (2013.01); *E05Y 2900/132* (2013.01)

(58) Field of Classification Search
CPC ........ E05F 15/614; H02K 7/116; H02K 11/21
See application file for complete search history.

(56) References Cited

U.S. PATENT DOCUMENTS

| | | | | |
|---|---|---|---|---|
| 2008/0256869 A1* | 10/2008 | Nixon | ...................... | E05F 3/227 49/506 |
| 2016/0356071 A1* | 12/2016 | Potter | ................... | E05F 15/616 |
| 2018/0331685 A1* | 11/2018 | Olson | ................... | E05F 15/614 |

* cited by examiner

*Primary Examiner* — Muhammad S Islam
(74) *Attorney, Agent, or Firm* — Miguel Villarreal, Jr.; Gunn, Lee & Cave, P.C.

(57) ABSTRACT

An encoder driven non-handed electric door operator for operating a door comprises an encoder, shaft, coil spring and a motor. The motor is configured to receive an external set of predetermined instructions. A plurality of gear assemblies in communication with each other allow the door operator to function. The shaft is solid and has nondetachable gear/splines at each end that drives the door operator. A controller which may be at a remote location transmits an external set of predetermined instructions to the encoder motor for proper operation. The door operator also has top and bottom plates that are parallel to each other. The plates are spaced a distance sufficient from each other to accommodate the encoder motor, encoder motor mounting plate, first, second and third gear assemblies, shaft, and coil spring therebetween.

5 Claims, 9 Drawing Sheets

ENCODER DRIVEN NON-HANDED ELECTRIC DOOR OPERATOR

CROSS REFERENCE TO RELATED APPLICATIONS

This original non-provisional application claims priority to and the benefit of U.S. provisional application Ser. No. 63/089,274, filed Oct. 8, 2020, and entitled "Encoder Driven Non-Handed Electric Door Operator," and to design patent application serial no. 29/779,182, filed Apr. 16, 2021, both of which are incorporated by reference herein.

STATEMENT REGARDING FEDERALLY SPONSORED RESEARCH OR DEVELOPMENT

None.

BACKGROUND OF THE INVENTION

1. Field of the Invention

The present invention relates to a door operator. More specifically, the present invention relates to an improvement on a non-handed electric door operator for industrial and commercial use.

2. DESCRIPTION OF THE RELATED ART

There exists in the prior art automated door opening units (called "operators") used to operate swing doors. Many businesses and public buildings incorporate these operator mechanisms or devices to their swing doors. These swing doors may also generally be connected to a sensor (e.g., motion sensor, push button, etc. . . . ) which may be used by the user to then open the doors. Opening of the doors may either be by swinging a door inward to the left or to the right or even swinging a door outward to the left or to the right.

The door operators may be designated as a "left-hand" unit (and "LH" unit), which causes an inswing on a left-hand door; (2) a "left-hand reverse" unit (and "LHR" unit), which causes an outswing on a left-hand door; (3) a "right-hand" unit (and "RH" unit), which causes an inswing on a right-hand door; and (4) a "right-hand reverse" unit (and "RHR" unit), which causes announcement on a right-hand door.

These several variations of door operators force a service technician to always carry several variations in inventory and on hand when going to do a repair. This is because the service technician never knows which of the door operators (LH, LHR, RH, RHR) may be faulty.

The inventor previously solved this problem by inventing a non-handed swing door operator, or "universal" door operator, as described in U.S. Pat. No. 8,720,113, issued May 13, 2014, and incorporated by reference herein. While the device in U.S. Pat. No. 8,720,113 has proven effective, the inventor has since made improvements to this device. These improvements are the subject of the present invention herein.

Some shortcomings of the device in U.S. Pat. No. 8,720,113 included that the drive gear/spline kept breaking off. A main shaft traverses the device and is to what external removable drive gears/splines attach to secure an arm (which connects to and opens and closes a swing door) to the device via the shaft.

The inventor discovered that the drive gear/spline ends were subject to breaking off requiring repair of the operator. The inventor discovered the reason for the breakage was because during the fabrication stage of the shaft, the shaft had to be hollowed out. After this was done, there was only approximately 1/16" of material left. Consequently, the hollowing out process weakened the spline.

Another concern for the inventor was the use of cams and switch assemblies. The door operator of U.S. Pat. No. 8,720,113 uses cams to activate the switch. However, over time, rotational alignment of the cams can slip, necessitating realignment to ensure proper operating range of the swing door. Adjustments were made manually, generally requiring the use of a screwdriver tip or other comparable tool to make the adjustments. This means if the door operator required realignment, a service technician would need to be dispatched to perform the alignment.

Therefore, there is a need for a universal non-handed door operator with a robust main drive shaft and an internal encoder motor and controller that is a more user-friendly, cost-efficient, programmable, reliable and accurate device.

BRIEF SUMMARY OF THE INVENTION

Figure 1:
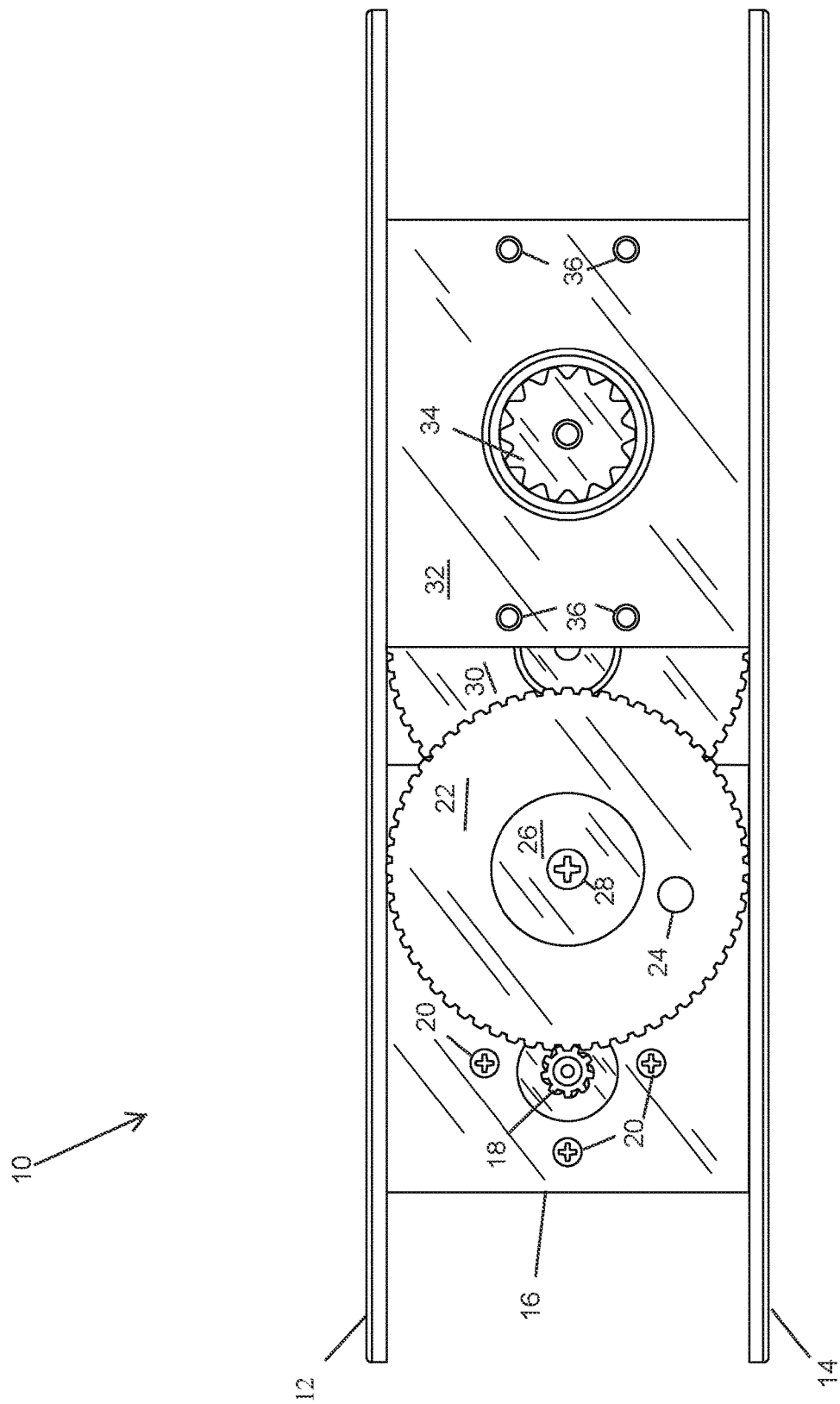
FIG. 1 is a front view of an embodiment of the present invention.

The present invention is an improvement to a non-handed door operator. The present invention includes a motor having an internal encoder, a controller, and a single solid drive gear.

More particularly, the present invention is an encoder driven non-handed electric door operator for operating a door, said door operator comprising: an encoder motor having an encoder motor gear at one end, said encoder motor configured to receive an external set of predetermined instructions; an encoder motor mounting plate in connection with said encoder motor, said encoder motor gear traversing said encoder motor mounting bracket; a first gear assembly in connection with said encoder motor mounting bracket and in communication with said encoder motor gear; a main mounting bracket in connection with said encoder motor mounting bracket, said first gear assembly traversing said encoder motor mounting bracket and in connection with said main mounting bracket; a second gear assembly in communication with said first gear assembly and in connection with said main mounting bracket; a third gear assembly in communication with said second gear assembly and in connection with said main mounting bracket; a shaft having a first end and a second end, wherein each of said first end and second end of said shaft terminates in a nondetachable gear/spline; a shaft plate connected to said third gear assembly and wherein said first end of said shaft traverses said main mounting bracket, said third gear assembly and said shaft plate; a coil spring connected to said shaft; a coil spring mounting plate connected to said coil spring, said second end of said shaft traversing said coil spring and said coil spring mounting plate; a controller in communication with said encoder motor, said controller for transmitting said external set of predetermined instructions to said encoder motor; and a plurality of plates in connection with said encoder motor mounting plate, main mounting bracket, and coil spring mounting plate, each of said plurality of plates spaced a distance sufficient to accommodate said encoder motor, said encoder motor mounting plate, said first, second and third gear assemblies, said shaft, and said coil spring, said plurality of plates parallel to one another.

The encoder driven non-handed door operator of the present invention results in fewer components and renders the present invention a more robust, reliable, user-friendly, cost-efficient, programmable, and accurate device than its predecessor.

DETAILED DESCRIPTION OF THE INVENTION

The present invention is an improvement to a non-handed door operator. The present invention includes a motor having an internal encoder, a controller, and a single solid drive gear resulting in fewer components and rendering the present invention a more robust, reliable, user-friendly, cost-efficient, programmable, and accurate device than its predecessor.

The present invention has one spline extending distally from the gear box on one side, and a separate spline on the opposite side also extending distally from the gear box (a "double spline" configuration). This solid spline is less likely to break off because the spline is not hollowed out but rather consists now of solid steel. The solid steel is an integral part of the last drive gear in the box.

The present invention further eliminates the use of cams. Instead, the present invention replaces the cams with an intelligent encoder (e.g., to count the revolutions). More particularly, the motor of the present invention has an internal encoder that counts revolutions and calculates the amount that the cams were doing, but does so automatically and in real-time.

A controller connected to the motor may be pre-programmed with a set of instructions to operate the door operator as desired (e.g., how far the door should swing open before it stops? When the door should stop? How long the door is to be held in an open position? How fast the door should swing open? How fast the door should swing closed?).

Referring now to FIG. 1, a front view of door operator 10 is shown. Door operator 10 has a top plate 12 and bottom plate 14. Additional components of door operator 10 are located between top plate 12 and bottom plate 14. For example, motor mounting plate 16 provides a mounting location for encoder motor gear 18 which traverses therein. Encoder motor 48 (not shown) is mounted to motor mounting plate via several fasteners 20. While the present invention uses screws, any comparable fastener, such as set screws, hex screws and the like may be used and remain within the contemplation of the present invention. First gear assembly 22 attaches to and is in connection with encoder motor mounting bracket 16. First gear assembly 22 is also in communication with encoder motor gear 18, such that one gear rotating causes the other to do so as well. First gear assembly 22 maintains access opening 24 (remnant of U.S. Pat. No. 8,720,113) and is held securely in position by end plate 26 via fastener 28.

Second gear assembly 30 is in communication with first gear assembly 22. Coil spring mounting plate 32 supports the end of shaft 34. Coil spring mounting plate 32 is connected to a coil spring (not shown). Coil spring mounting plate 32 is held in place with screws placed within screw holes 36.

Figure 2:
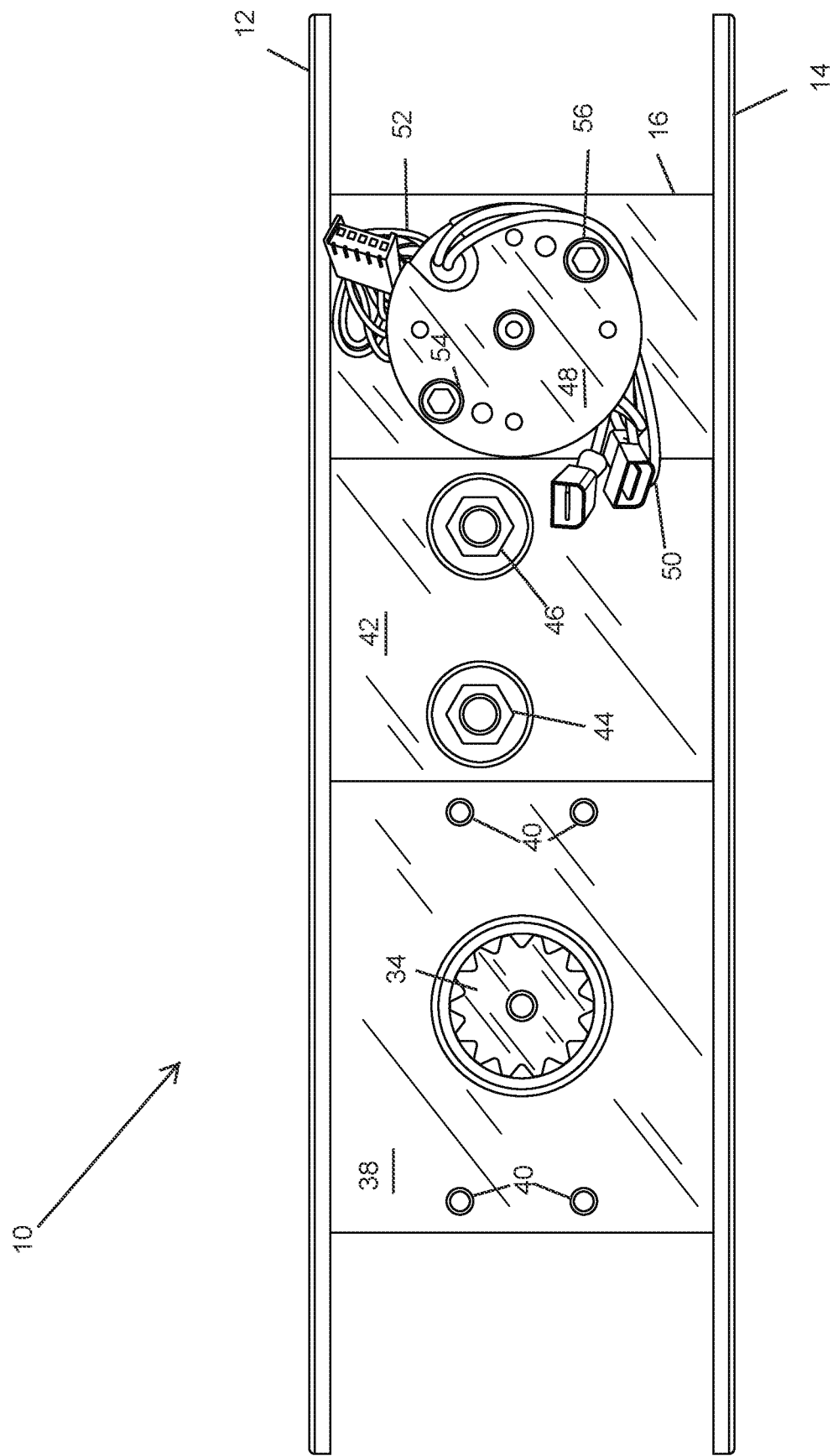
FIG. 2 is a back view of an embodiment of the present invention.

Referring now to FIG. 2, the back of door operator 10 is shown. Coil plate 38 (similar to coil plate 32) supports the end of shaft 34 and is secured with screws placed within screw holes 40. Main mounting bracket 62 provides load bearing support for all components and is secured via fasteners 44 and 46, which may be set screws. Encoder motor 48 attaches and is secured to motor mounting plate 16 via set screws 54 and 56. Wiring 50 and 52 provide means for communication between encoder motor 48 and another component, e.g., a controller (not shown) remotely located.

Figure 3:
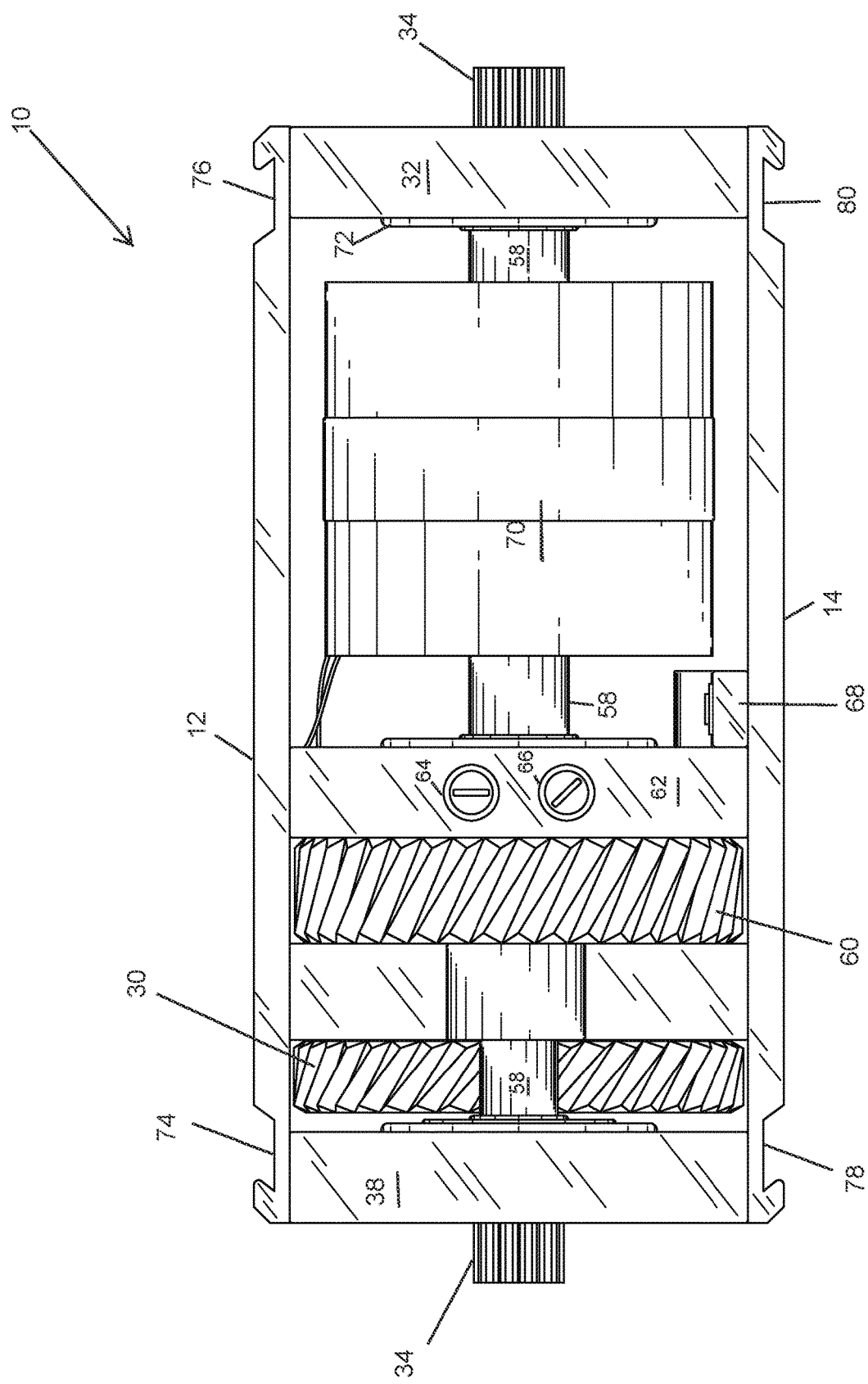
FIG. 3 shows a right side view of the present invention.

Referring now to FIG. 3, top and bottom plates 12 and 14 are shown attached to plate 32, main mounting bracket 62 and coil plate 38. Grooves 74 and 76 on top plate 12 traverse the length of top plate 12. Similarly, grooves 78 and 80 on the bottom plate 14 traverse the length of bottom plate 14. First gear assembly 30 aligns along the same longitudinal axis as coil spring 70. Shaft 58 traverses through plates 32, spacer 72, coil spring 70, main mounting bracket 62, first gear assembly 30 and coil plate 38. Grooves 74 and 76 and 78 and 80 allow door operator 10 to be retrofitted to various brands and types of door operators as such grooves may accommodate the various different configurations of existing door operators.

Still referring to FIG. 3, each end of shaft 58 terminates in a nondetachable gear drive 34 that extends distally beyond plates 32 and coil plate 38. The construction of such nondetachable gear drive 34 is of solid material (steel) such as to minimize or element sheering off during use. It is this nondetachable gear drive 34 (at either end) that an arm (not shown) will attach and be operated by the door operator of the present invention to open a swing door. The nondetachable gear drive to which the arm is to be attached is dependent on the desired direction of the opening of the swing door (e.g., LH, LHR, RH, RHR).

Figure 4:
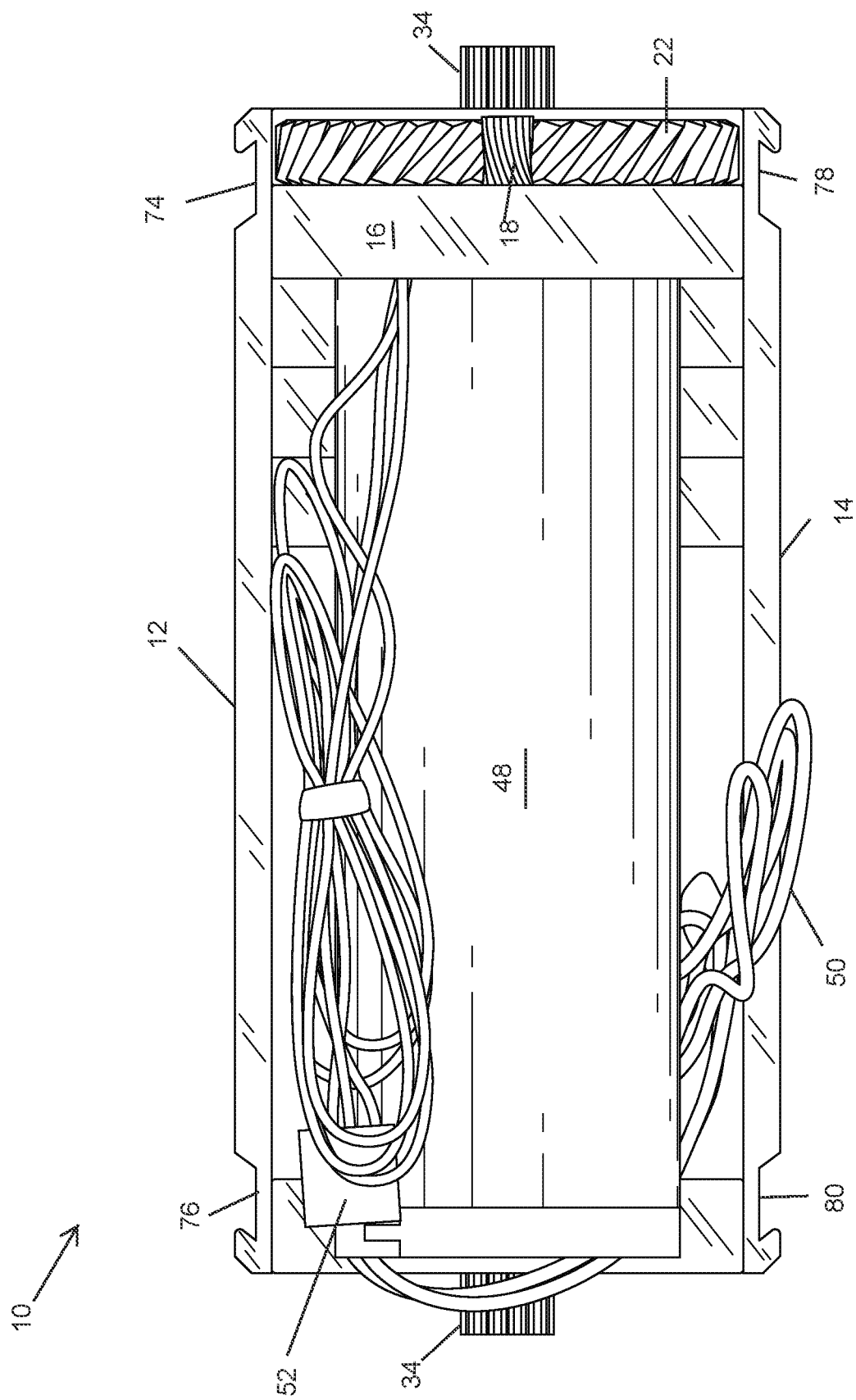
FIG. 4 depicts a left side view of an embodiment of the present invention.

Now referring to FIG. 4, door operator 10 includes encoder motor 48. Door operator 10 automatically and in real time causes a swing door (not shown) to open (at various degrees of openness) and close (at various degrees of closeness). This is because door operator 10 includes an internal encoder that counts revolutions and calculates the amount that the cams were doing, but does so automatically and in real-time. A controller connected to encoder motor 48 may be pre-programmed with a set of instructions to operate door operator 10 as desired.

Figure 5:
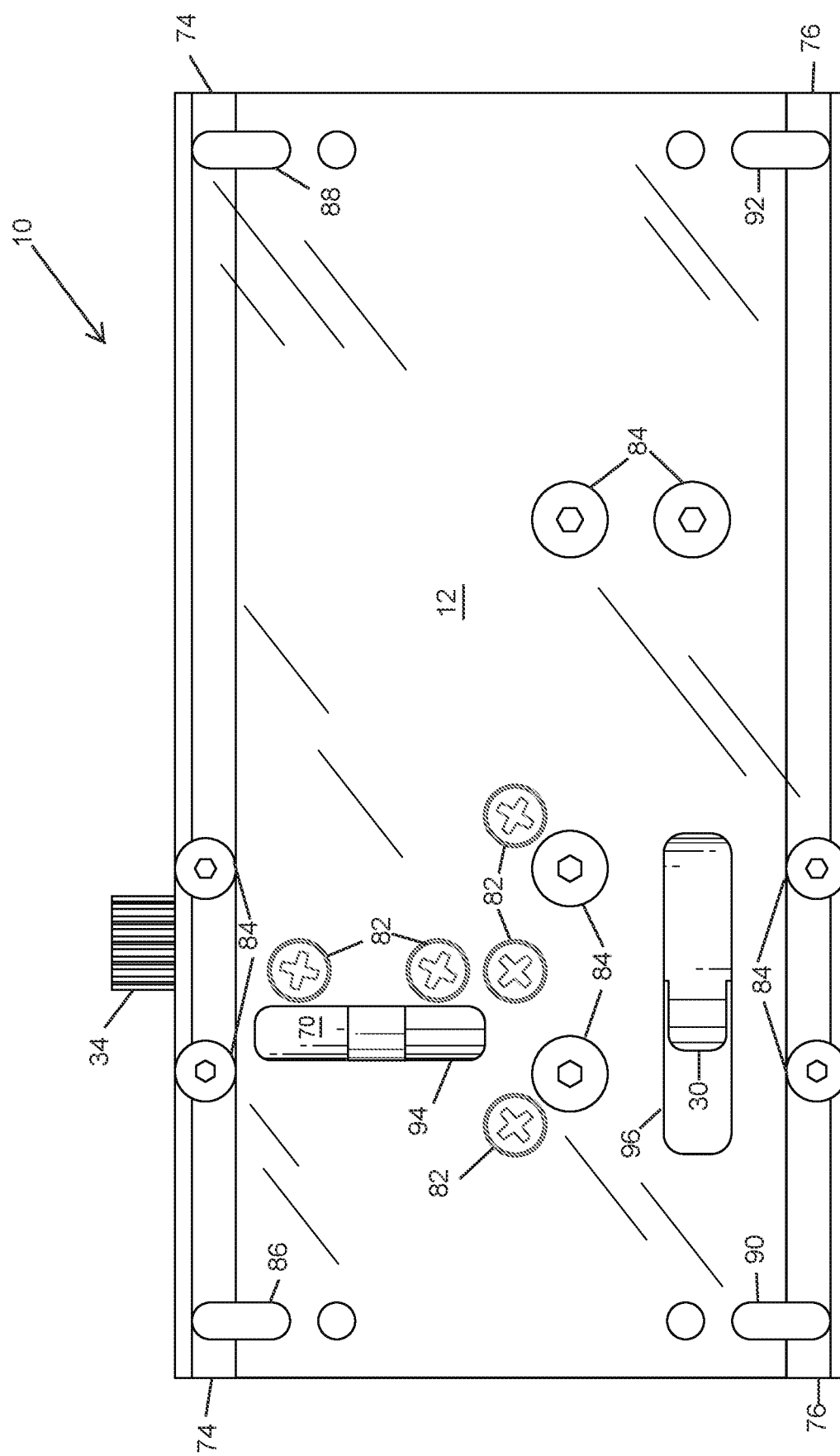
FIG. 5 shows a top view of an embodiment of the present invention.

FIG. 5 depicts a top view of an embodiment of the present invention. More particularly, top plate 12 of door operator 10 contains several large mounting slots to accommodate different mounting requirements (e.g., mounting slots 86, 88, 90, 92) of various existing door operators. Fasteners 82 used to secure top plate 12 to main mounting bracket 62 (not shown) may be screws (e.g., Phillips screws). Other fasteners, such as hex or Allen screws 84 may also be used. Nondetachable gear drives 34 extend beyond the edge of top plate 12, as shown in FIG. 5.

Figure 6:
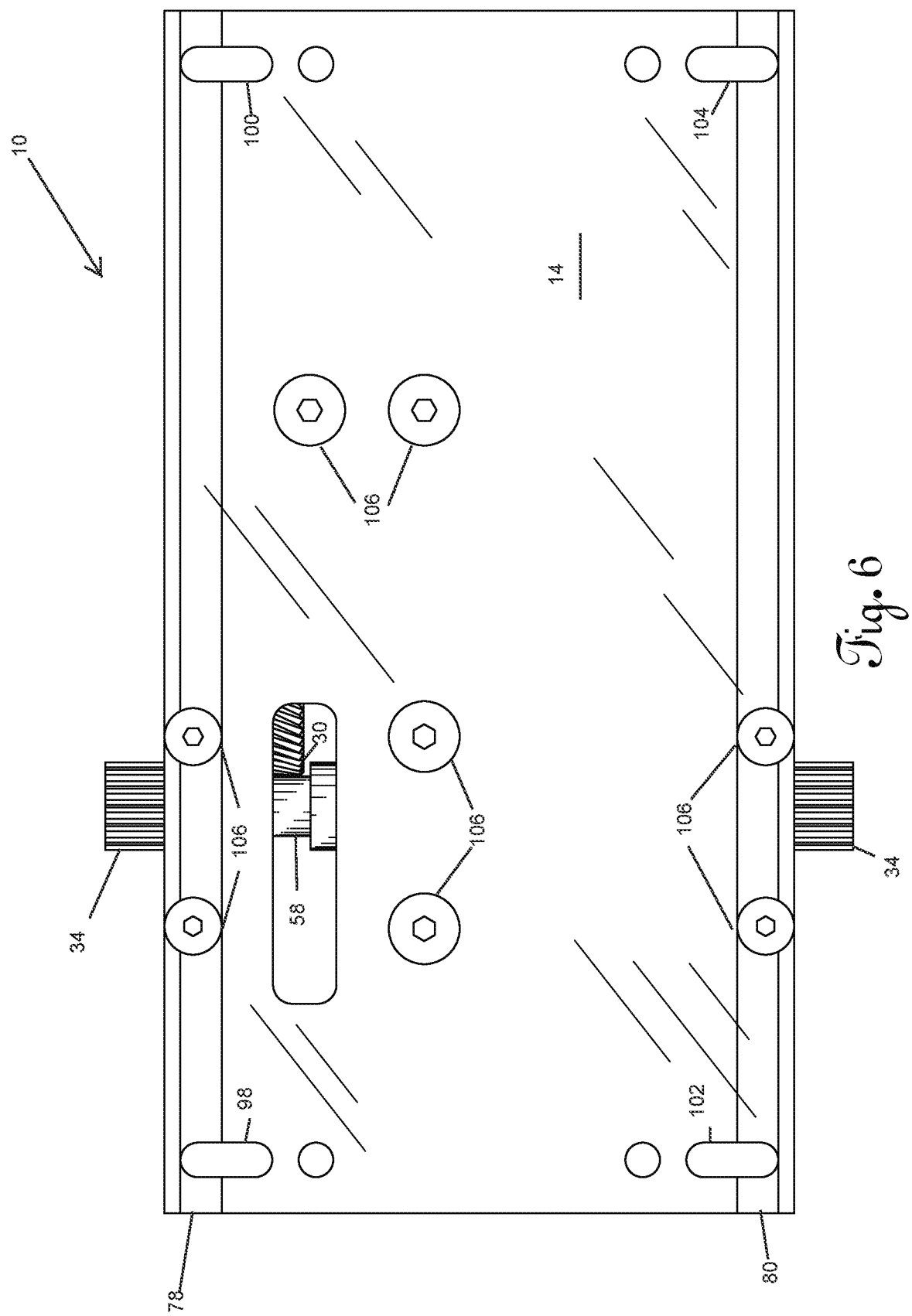
FIG. 6 shows a bottom view of an embodiment of the present invention.

Bottom plate 14 has similar features. Similar fasteners (e.g., 106) are used to secure bottom plate 14 to main mounting bracket 62. Similar mounting slots (e.g., 98, 100, 102, 104) also are included in bottom plate 14 should the occasion arise that bottom plate 14 should be the side that is mounted to an existing device, as shown in FIG. 6.

The top and bottom plates of the present invention are comparable to those of the door operator of U.S. Pat. No. 8,720,113. However, the improvements made the subject of the present invention increased the overall size of the gear box. There is approximately a ¾" of an inch increase in overall height of the gear box unit.

Figure 7:
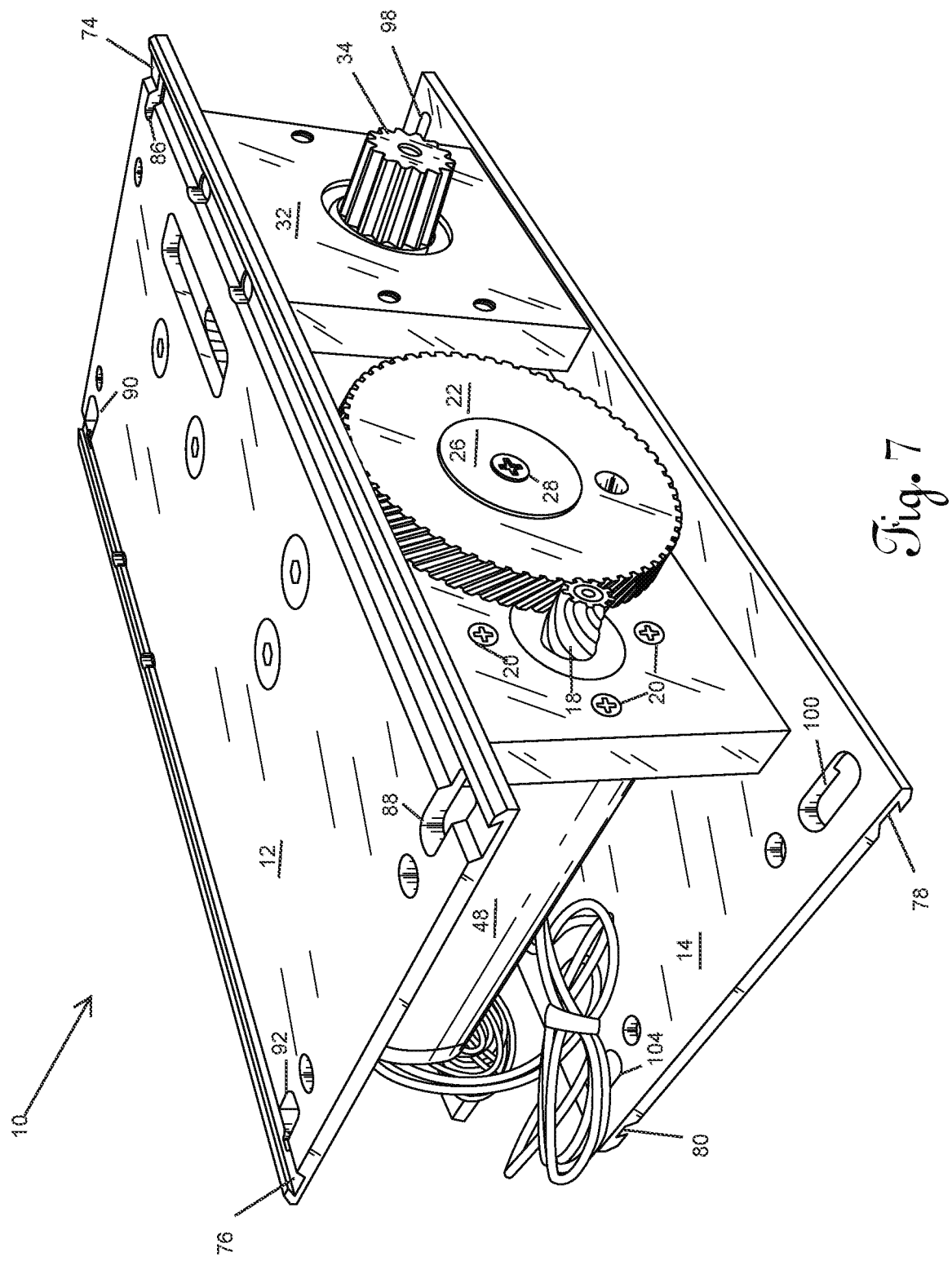
FIG. 7 depicts a front left side perspective view of the present invention.
Figure 8:
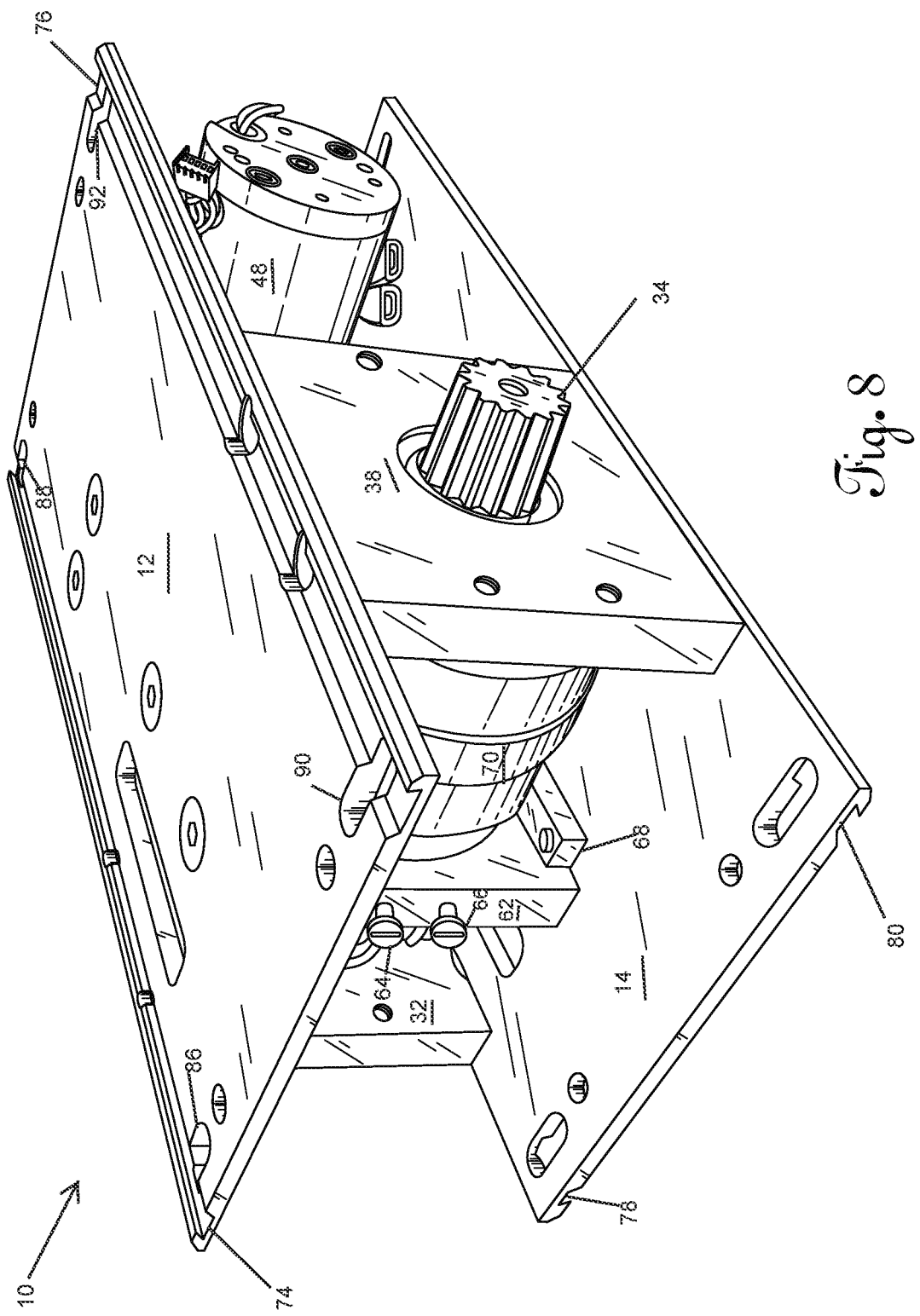
FIG. 8 shows a back right side perspective view of an embodiment of the present invention.
Figure 9:
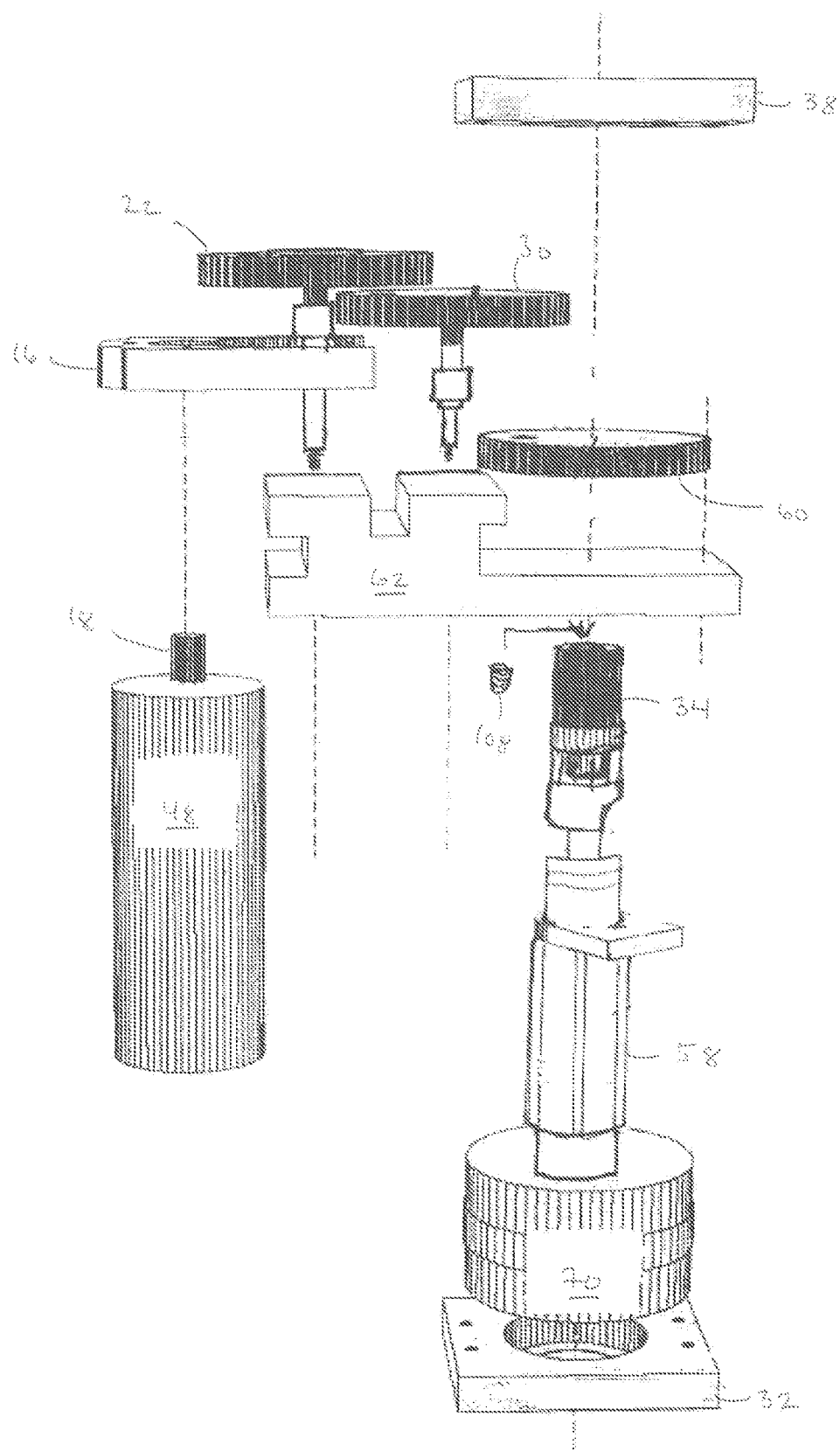
FIG. 9 depicts an exploded view internal components of an embodiment of the present invention.

Referring now to FIGS. 7 and 8, front and back perspective views of door operator 10 are shown. An exploded view of the various internal components is shown in FIG. 9.

These improvements to the non-handed door operator now provide more predictability, reliability, robustness and better programmability to the door operator.

While the present invention is described as being electrically connected to the controller for the door operator, the present invention may also be wireless and send and receive signals via Bluetooth® or other comparable wireless technology platform.

The present invention has application in the medical industry, such as swing doors used in hospitals (e.g., admittance or emergency room, surgery, recovery areas). However, it is contemplated that the present invention may also have application in other areas such as hotels, restaurants, commercial buildings and warehouses, where large doors require automatic opening to, for example, allow physically impaired individuals easy access into such structures (where it may be difficult otherwise) or to allow large items to be pushed through on rollers where individuals are handling the deliverables and such encoder driven non-handed door operators facilitate passing through a single swing door or even double swing doors.

These improvements necessarily reduced the number of components required to perform the functions of the door operator. Fewer components means fewer areas for failure of the device, and thus also translates to less inventory and reduced or eliminated repair costs—because there are less components which can fail—yielding a cost savings to the users.

The various embodiments described herein may be used singularly or in conjunction with other similar devices. The present disclosure includes preferred or illustrative embodiments of specifically described apparatuses, assemblies, and systems. Alternative embodiments of such apparatuses, assemblies, and systems can be used in carrying out the invention as described herein. Other aspects and advantages of the present invention may be obtained from a study of this disclosure and the drawings.

I claim:

1. An encoder driven non-handed electric door operator for operating a door, said door operator comprising:

an encoder motor having an encoder motor gear at one end, said encoder motor configured to receive an external set of predetermined instructions;

an encoder motor mounting plate in connection with said encoder motor, said encoder motor gear traversing said encoder motor mounting bracket;

a first gear assembly in connection with said encoder motor mounting bracket and in communication with said encoder motor gear;

a main mounting bracket in connection with said encoder motor mounting bracket, said first gear assembly traversing said encoder motor mounting bracket and in connection with said main mounting bracket;

a second gear assembly in communication with said first gear assembly and in connection with said main mounting bracket;

a third gear assembly in communication with said second gear assembly and in connection with said main mounting bracket;

a shaft having a first end and a second end, wherein each of said first end and second end of said shaft terminates in a nondetachable gear/spline;

a shaft plate connected to said third gear assembly and wherein said first end of said shaft traverses said main mounting bracket, said third gear assembly and said shaft plate;

a coil spring connected to said shaft;

a coil spring mounting plate connected to said coil spring, said second end of said shaft traversing said coil spring and said coil spring mounting plate;

a controller in communication with said encoder motor, said controller for transmitting said external set of predetermined instructions to said encoder motor; and a plurality of plates in connection with said encoder motor mounting plate, main mounting bracket, and coil spring mounting plate, each of said plurality of plates spaced a distance sufficient from each other to accommodate said encoder motor, said encoder motor mounting plate, said first, second and third gear assemblies, said shaft, and said coil spring, said plurality of plates parallel to one another.

2. The door operator, as recited in claim 1, further comprising an arm attached to said door via said nondetachable gear/spline of said shaft.

3. The door operator, as recited in claim 2, wherein said nondetachable gear/spline is comprised of solid material.

4. The door operator, as recited in claim 3, wherein said external set of predetermined instructions may be configured to automatically and in real time determine a number of revolutions required to activate said door.

5. The door operator, as recited in claim 4, wherein said plurality of plates further comprises a pair of grooves traversing the length of said plurality of plates.

* * * * *